United States Patent
Chiproot

(10) Patent No.: US 11,415,223 B2
(45) Date of Patent: Aug. 16, 2022

(54) COMPRESSIBILE SEAL FOR PIPE CLAMP

(71) Applicant: Krausz Industries Ltd., Tel Aviv (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 176 days.

(21) Appl. No.: 16/710,028

(22) Filed: Dec. 11, 2019

(65) Prior Publication Data
US 2021/0180697 A1  Jun. 17, 2021

(51) Int. Cl.
*F16J 15/02* (2006.01)
*F16J 15/10* (2006.01)

(52) U.S. Cl.
CPC ........... *F16J 15/027* (2013.01); *F16J 15/104* (2013.01)

(58) Field of Classification Search
CPC ....... F16L 17/032; F16L 17/035; F16L 17/04; F16L 21/022; F16L 21/06; F16L 21/065; F16J 15/027; F16J 15/104
See application file for complete search history.

(56) References Cited

U.S. PATENT DOCUMENTS

| | | | | |
|---|---|---|---|---|
| 2,259,940 A * | 10/1941 | Nathan | ................. | F16L 17/035 277/626 |
| 3,020,054 A * | 2/1962 | Driancourt | ............ | F16L 17/035 277/626 |
| 3,647,229 A * | 3/1972 | Grimes | ................. | F16L 17/025 277/615 |
| 7,722,092 B2 * | 5/2010 | Kim | ........................ | F16L 21/06 285/364 |
| 8,960,683 B2 * | 2/2015 | Krausz | .................... | F16L 25/14 277/605 |
| 9,310,002 B2 * | 4/2016 | Chiproot | ................ | F16J 15/025 |
| 9,551,444 B2 * | 1/2017 | Chiproot | ............... | F16L 21/002 |
| 2006/0208486 A1 * | 9/2006 | Kim | ........................ | F16L 23/08 285/364 |
| 2010/0148452 A1 | 6/2010 | Westhoff | | |
| 2011/0266754 A1 * | 11/2011 | Krausz | ................. | F16L 21/005 277/605 |
| 2014/0001709 A1 * | 1/2014 | Chiproot | ................. | F16L 17/00 277/627 |
| 2016/0208964 A1 * | 7/2016 | Chiproot | ............ | F16L 55/1725 |

FOREIGN PATENT DOCUMENTS

| | | |
|---|---|---|
| EP | 2679872 | 1/2014 |
| WO | 2010/080742 | 1/2010 |

OTHER PUBLICATIONS

European Search Report, EP 20212625.6, dated Apr. 12, 2021.

* cited by examiner

*Primary Examiner* — Nicholas L Foster
(74) *Attorney, Agent, or Firm* — Dekel Patent Ltd; David Klein

(57) ABSTRACT

A seal includes a sealing ring constructed with a first portion folded over a second portion so as to define at least one inner annular space bounded by the first and second portions. At least one hollow portion is at least partially annular, and is formed in the sealing ring in at least one of the first portion and the second portion.

3 Claims, 1 Drawing Sheet

COMPRESSIBILE SEAL FOR PIPE CLAMP

FIELD OF THE INVENTION

The present invention relates generally to clamps and grip rings for pipes, and particularly to improving the compressibility of hydraulic seal assemblies for clamps.

BACKGROUND OF THE INVENTION

FIG. 1 illustrates a prior art seal 1, which includes a sealing ring 2 with an outer portion 3 folded over an inner portion 4 so as to define an inner annular space 5 between and bounded by the inner and outer portions 4 and 3. The inner annular space 5 is in fluid communication with a fluid (e.g., water, not shown) flowing in a pipe sealed by seal 1. The fluid enters inner annular space 5 via one or more apertures (not shown) formed in a side wall of sealing ring 2 and the fluid applies pressure in inner annular space 5 to increase tightening of the seal.

The seal is generally used in clamping rings, the ends of which are tightened by bolts to squeeze and press the seal against the outer perimeter of one or more pipes. It is important to note that the seal is confined in an inner annular portion of the clamping ring.

A problem has occurred with seals of this type. Although the seal is made of rubber or other resilient material, it has been found that the seal does not compress easily because the inner annular portion of the clamping ring limits and suppresses any possible bulging of the seal. As a result, the seal's hardness increases, the seal behaves quite rigidly and a significant tightening force must be generated by the bolt in order to squeeze the seal against the pipe.

The seal typically has a hardness of 80 Shor. An intuitive solution is to make the seal of a softer material, such as 70 Shor; however, in practice it has been found that this does not solve the problem because the confined seal's hardness increases during tightening such that even 70 Shor increases to 90 Shor or more. On the other hand, it is not possible to start off with a very soft rubber because there is a lower limit in many applications as to the hardness of the rubber which is required to achieve a proper seal on the pipe and a limit according to certain standards for seals.

SUMMARY OF THE INVENTION

The present invention seeks to provide an improved seal for pipe clamps which is more readily compressible and solves the above problem, as is described more in detail hereinbelow.

There is thus provided in accordance with an embodiment of the present invention a seal including a sealing ring constructed with a first portion folded over a second portion so as to define at least one inner annular space bounded by the first and second portions, and at least one hollow portion which is at least partially annular, formed in the sealing ring in the first portion and/or second portion.

The at least one hollow portion may extend 360° around the sealing ring; alternatively, it may subtend an angle less than 360° over a portion of the sealing ring.

The hollow portion may be located more radially outward or inward of the at least one inner annular space.

There may be more than one hollow portion symmetric about a central axis of a cross-section of the sealing ring.

There may be more than one hollow portion asymmetric about a central axis of a cross-section of the sealing ring.

The at least one hollow portion may include an at least partially annular rib.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
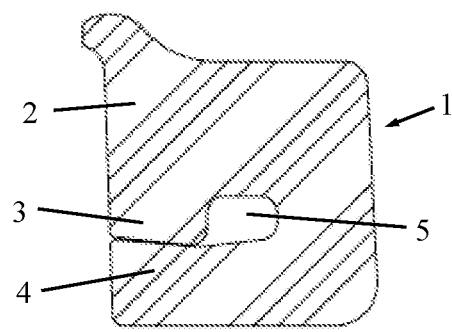
FIG. 1 is a sectional illustration of a prior art seal.
Figure 2:
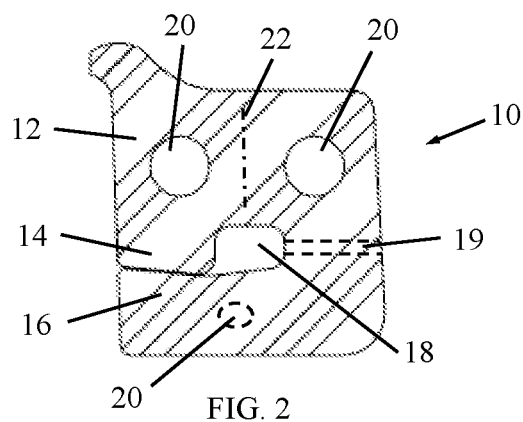
FIG. 2 is a sectional illustration of a seal, constructed and operative in accordance with a non-limiting embodiment of the present invention.

Reference is now made to FIG. 2, which illustrates a seal 10, constructed and operative in accordance with a non-limiting embodiment of the present invention.

Seal 10 includes a sealing ring 12 constructed with a first portion 14 (outer means more radially outward) folded over a second portion 16 so as to define at least one inner annular space 18 between and bounded by the first and second portions 16 and 14. The first portion 14 may be in some applications the radially outer portion but in other applications may be the radially inner portion, or the outer or inner axial portion or other configurations. The inner annular space 18 is in fluid communication with a fluid (e.g., water, not shown) flowing in a pipe sealed by seal 10. The fluid may enter inner annular space 18 via one or more apertures 19 formed in a side wall of sealing ring 12 (preferably through the inner side wall of first portion 14, but alternatively could be through second portion 16). The fluid applies pressure in inner annular space 18 to increase tightening of the seal.

Seal 10 is formed with at least one hollow portion 20 which is at least partially annular. This means that hollow portion 20 may be fully annular (that is, extends 360° around the sealing ring 12) or partially annular (that is, subtends an angle less than 360° over a portion of the sealing ring 12). The illustrated embodiment in FIG. 2 shows two such hollow portions 20, but the invention is not limited to this number. The hollow portions 20 may be symmetric about a central axis 22 of a cross-section of sealing ring 12, or alternatively may be asymmetric about axis 22.

The hollow portion 20 is formed in sealing ring 12 either more radially outward or more radially inward of the inner annular space 18. The one or more hollow portions 20 may be located in first portion 14; additionally or alternatively they may be located in second portion 16 as show in broken lines in FIG. 2 (which is offset to the left of the axis 22 in the figure). The cross-sectional shape of the hollow portion may be circular (as in the upper portions of the figure) or non-circular, such as elliptical (as in the lower portion of the figure) or any other shape.

It has been surprisingly found that the hollow portion or portions 20 solve the abovementioned problem and significantly reduce the force required to tighten the seal against the pipe, without compromising the functionality of the seal and without changing the material hardness.

Figure 3A:
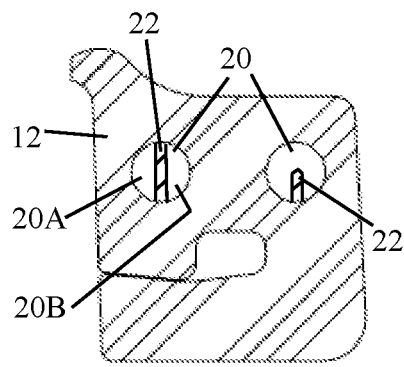
FIGS. 3A and 3B are simplified sectional illustrations of the seal, constructed and operative in accordance with other non-limiting embodiments of the present invention.
Figure 3B:
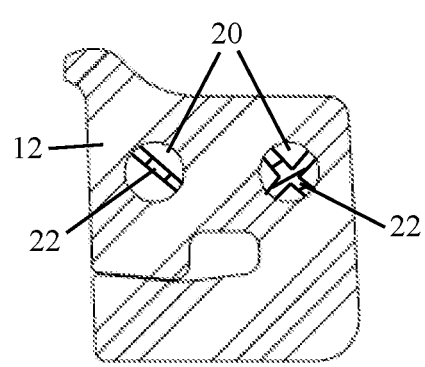

Reference is now made to FIGS. 3A and 3B, which illustrate different variations of the embodiment of FIG. 2. In FIG. 3A, at least one of the hollow portions 20 includes an at least partially annular rib 22. As before, this means that rib 22 may be fully annular (that is, extends 360° around the sealing ring 12) or partially annular (that is, subtends an angle less than 360° over a portion of the sealing ring 12); the subtended angle may be different than the subtended angle of hollow portion 20.

In the left hollow portion of FIG. 3A, rib 22 is a full partition, separating hollow portion 20 into two portions 20A and 20B. In the right hollow portion of FIG. 3A, rib 22 is only a partial partition. In FIG. 3A, rib 22 is "vertical" in the sense of the drawing, meaning it is radial with respect to the center of the sealing ring 12.

In the left hollow portion of FIG. 3B, rib 22 is not radial with respect to the center of the sealing ring 12, but instead is tilted from a radial direction. In the right hollow portion of FIG. 3B, rib 22 is cross-shaped. Other shapes are within the scope of the invention, too.

The addition of the rib 22 may be used to adjust the stiffness/rigidity of the seal 10. Moreover, the shape and position of rib 22 may be used to achieve non-uniform rigidity of the seal for certain applications.

What is claimed is:

1. A seal comprising:
   a sealing ring constructed with a first portion folded over a second portion so as to define at least one inner annular space bounded by said first and second portions; and
   at least one hollow portion, which is at least partially annular, formed in said sealing ring in at least one of said first portion and said second portion, wherein said at least one hollow portion does not extend circumferentially completely about a central axis of the sealing ring.

2. The seal according to claim 1, wherein said at least one hollow portion comprises more than one hollow portions which are symmetric about a central axis of a cross-section of said sealing ring.

3. The seal according to claim 1, wherein said at least one hollow portion comprises more than one hollow portion which are asymmetric about a central axis of a cross-section of said sealing ring.

\* \* \* \* \*